Patented Apr. 21, 1925.

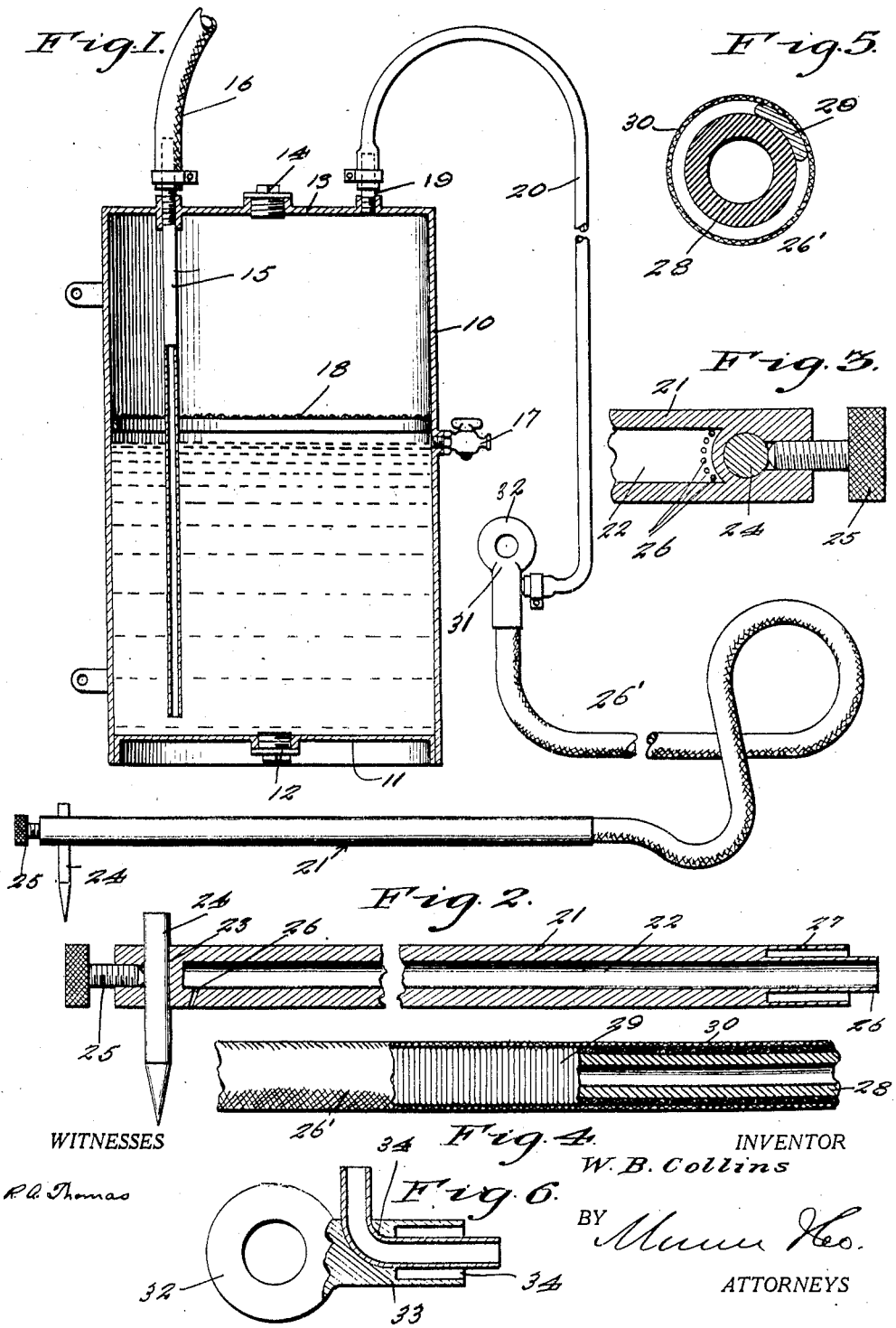

1,534,688

UNITED STATES PATENT OFFICE.

WILLIAM BRUCE COLLINS, OF RALEIGH, NORTH CAROLINA.

ELECTRIC WELDING DEVICE.

Application filed August 29, 1923. Serial No. 659,992.

*To all whom it may concern:*

Be it known that I, WILLIAM B. COLLINS, a citizen of the United States, and a resident of Raleigh, in the county of Wake and State of North Caroline, have invented certain new and useful Improvements in Electric Welding Devices, of which the following is a specification.

This invention relates to an electric welding device.

The object of the invention is to provide a device of the above character of such construction and operation whereby the arc electrode associated therewith may be maintained at the proper temperature.

It is also an object of the invention that the means employed for maintaining the arc electrode at the proper temperature in no way interfere with a welding operation.

Other objects, and objects relating to details of construction, combination and arrangement of parts will hereinafter appear in the detailed description to follow.

The invention is illustrated by way of example in the accompanying drawings, in which Figure 1 is a vertical sectional view taken through the filter tank of the present invention and also showing the electrode holder connected with said tank so that the electrode carried by said holder may be cooled;

Figure 2 is a longitudinal sectional view of the electrode holder;

Figure 3 is a detail sectional view more clearly illustrating the manner in which compressed air may be delivered against the electrode;

Figure 4 is a detail view, partly in section and partly in elevation, illustrating the particular construction of the combined current conductor and compressed air delivery member;

Figure 5 is a transverse sectional view of the same; and

Figure 6 is a detail sectional view illustrating the terminal lug for connecting the electrode to one side of the source of electric current supply and also showing the manner in which compressed air may be connected with this lug.

Referring to the drawings more particularly, 10 indicates generally a tank which has its bottom 11 provided with a drain plug 12 and its top 13 provided with an inlet plug 14. A tube 15 is positioned within the tank 10 and suitably secured to the top 13 of the tank, as shown. The lower end of this tube extends in close proximity to the bottom of the tank and its upper end is projected from the tank whereby to facilitate the connection of a hose or the like 16 to the upper end of this tube. The tank 10 is also provided with an outlet valve 17 at a point substantially central to its height, and this valve may be employed for controlling the water level within the tank. Immediately above the water level indicated in the tank 10 there is positioned an extremely fine mesh screen 18, the purpose of which will later be described. The top wall 13 of the tank 10 also carries a short pipe section 19 which is threaded therethrough as shown, and which is connected to the one end of a hose 20.

At 21 there is shown what is termed an electrode holder which, as best seen in Figure 2, is an elongated rod provided with a longitudinally extending bore 22, said bore terminating adjacent one end of the bar, and this last named end of the bar is provided with a suitable transverse opening 23 adapted to receive an electrode 24, said electrode being adjustably held by a set screw 25 threaded into the associated end of the bar 21. The bore 22 communicates with a plurality of orifices 26 which are disposed at such an inclination or angle that air pressure within the passage 22 escaping therefrom will be directed against the electrode 24.

The remaining end of the holder 21 terminates in a pair of sleeves 26 and 27, the interior of the sleeve 26 being a continuation of the bore 22 and the sleeve 27 encircling the sleeve 26 as shown.

A flexible coupling 26' between the hose 20 and the holder 21 is provided, said flexible coupling comprising a tube 28 preferably made of rubber or the like and adapted to be received by the sleeve extension 26 of the tube holder 21. About the tube 28 there is wrapped electric current conducting wires 29 and about these wires there is placed suitable tape or other insulation, as at 30. With the extending of one end of the tube 28 into the sleeve extension 26 of the holder 21 the wires 29 will be disposed between the sleeves 26 and 27 and with the removal of the insulation 30 at this point about the wires, said wires may be soldered or otherwise electrically connected with the holder 21. The remaining end of the flexible coupling 26' has secured thereto a terminal lug 31, said lug comprising a ring portion 32 which is integrally formed with a stem portion 33, said stem portion being provided with a bore 34 which is adapted to receive the wires 30 of the coupler 26'. These wires may be soldered to the stem 33 whereby to obtain an electrical connection therebetween. An L-shaped tube 34 is provided and positioned within the stem 33 of the tongue or lug 31 as illustrated in Figure 6. The inner end of this tube 34 may be brought to communicate with the associated end of the tube 28 while the other end of said tube 34 may be connected to the associated end of the tube 20, as illustrated to advantage in Figure 1.

In the use of the present device the hose 16 may be connected to any suitable source of compressed air supply and this occurring the compressed air will be introduced beneath the liquid within the tank. The air will of course rise within said tank and in passing upwardly through the liquid will be filtered and thus all grease particles or other foreign substances within the air will be removed. The screen 18 will prevent bubbling of the water to any undesirable extent. The terminal 31 may be connected to one side of a suitable source of current supply and in doing this current may flow through the electrode 24 and in the usual manner the electrode 24 may be utilized for creating an arc and causing a welding of the materials being operated upon. The compressed air escaping from the tank 10 will pass through the tube 20, coupling 26, holder 21 and then be directed through the orifices 26 against the side of the electrode 24. It has been found that by continually applying air against the electrode that the same is maintained in sufficiently cool condition so that work can be proceeded with continuously. It has also been found that with an arrangement of this kind welding operations can be more expeditiously executed. It has further been found that by providing means for cooling the electrode, as in the present instance, that close and difficult work can be carried out with greater ease than when using an electrode that necessitates withdrawal and cooling of the same during an operation.

While I have shown and described the preferred form of my invention, I wish it to be understood that I am aware of the fact that the general structure, combination and arrangement of parts might be changed by those skilled in the art without departing from the spirit of my invention.

Having thus described my invention, I claim:

1. In a device of the character described, an elongated electrode holder having a longitudinally extending bore terminating adjacent one end of the holder, an electrode extended through the last named end of the holder and disposed transversely to said holder and said holder having angularly disposed passages communicating with the last named end of the bore thereof and adapted to direct compressed air from said bore against the one side of the electrode for the purpose described.

2. In combination, an electrode for electric welding, means whereby compressed fluid may be delivered to strike one side of the electrode and adjacent its free end, and means whereby said air may be filtered.

3. In a device of the character described, a tank, a liquid within said tank, means whereby compressed air may be delivered beneath the liquid thereby to filter the same when passing upwardly through the top of said container, an electrode, and means whereby said filtered air may be delivered to strike against said electrode for the purpose described.

4. In a device of the character described, a tank, a liquid within said tank, means whereby compressed air may be delivered beneath the liquid thereby to filter the same when passing upwardly through the top of said tank, a holder, an electrode carried thereby, and flexible means adapted to deliver compressed air from the tank to strike against said electrode.

5. In a device of the character described, a tank, a liquid within said tank, means whereby compressed air may be delivered beneath the liquid thereby to filter the same when passing upwardly through the top of said tank, a holder, an electrode carried thereby, and a flexible conductor adapted to deliver air from said tank to said electrode to strike the same and adapted for delivering electric current to said holder.

WILLIAM BRUCE COLLINS.